(12) United States Patent
Smith (10) Patent No.: US 12,126,976 B2
(45) Date of Patent: *Oct. 22, 2024

(54) SOUNDBAR

(71) Applicant: Bose Corporation, Framingham, MA (US)

(72) Inventor: David L. Smith, Wellesley, MA (US)

(73) Assignee: Bose Corporation, Framingham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/735,091

(22) Filed: May 2, 2022

(65) Prior Publication Data

US 2022/0337950 A1 Oct. 20, 2022

Related U.S. Application Data

(63) Continuation of application No. 17/038,843, filed on Sep. 30, 2020, now Pat. No. 11,323,813.

(51) Int. Cl.
*H04R 5/02* (2006.01)
*H04R 1/34* (2006.01)
*H04R 3/12* (2006.01)
*G06F 3/16* (2006.01)

(52) U.S. Cl.
CPC ............... *H04R 5/02* (2013.01); *H04R 1/345* (2013.01); *H04R 3/12* (2013.01); *G06F 3/165* (2013.01)

(58) Field of Classification Search
None
See application file for complete search history.

(56) References Cited

U.S. PATENT DOCUMENTS

| | | | | |
|---|---|---|---|---|
| 4,723,289 A | * | 2/1988 | Schreiber | H04R 5/02 381/99 |
| 2006/0072773 A1 | * | 4/2006 | Hughes, II | H04R 1/26 381/300 |
| 2013/0336504 A1 | * | 12/2013 | Mosgaard | H04R 5/02 381/300 |
| 2014/0126753 A1 | * | 5/2014 | Takumai | H04S 7/305 381/303 |
| 2015/0201279 A1 | * | 7/2015 | Sprinkle | H04R 1/00 381/162 |
| 2018/0242077 A1 | * | 8/2018 | Smithers | H04R 1/345 |

* cited by examiner

*Primary Examiner* — Duc Nguyen
*Assistant Examiner* — Assad Mohammed
(74) *Attorney, Agent, or Firm* — Hoffman Warnick LLC (57) ABSTRACT

A soundbar with a housing and a plurality of acoustic radiators carried by the housing and configured to output sound for at least left, right, and center audio channels, wherein at least one of the acoustic radiators comprises a dipole acoustic radiator that is configured to emit sound in opposite directions along a main radiation axis.

19 Claims, 6 Drawing Sheets

SOUNDBAR

PRIORITY CLAIM

This application is a continuation of U.S. patent application Ser. No. 17/038,843, filed Sep. 30, 2020, where the entire contents of the application are hereby incorporated by reference.

BACKGROUND

This disclosure relates to a soundbar.

Surround sound audio systems can be configured to reproduce left, right, center, surround, and height channels. Soundbars can be used for the left, right, and center channels, but are typically not useful for the height channels.

SUMMARY

All examples and features mentioned below can be combined in any technically possible way.

In one aspect a soundbar includes a housing and a plurality of acoustic radiators carried by the housing and configured to output sound for at least left, right, and center audio channels, wherein at least one of the acoustic radiators comprises a dipole acoustic radiator that is configured to emit sound in opposite directions along a main radiation axis.

Some examples include one of the above and/or below features, or any combination thereof In an example the dipole acoustic radiator is configured to output sound for a height audio channel. In an example the soundbar includes two separate dipole acoustic radiators, wherein one of the dipole acoustic radiators is configured to output sound for a left height audio channel and the other dipole acoustic radiator is configured to output sound for a right height audio channel. In an example the dipole acoustic radiator is configured to output sound for either the left or right audio channel. In an example the soundbar includes two separate dipole acoustic radiators, wherein one of the dipole acoustic radiators is configured to output sound for the left audio channel and the other dipole acoustic radiator is configured to output sound for the right audio channel.

Some examples include one of the above and/or below features, or any combination thereof In some examples the dipole acoustic radiator comprises an audio driver mounted in an enclosure such that a front surface of the driver is configured to radiate front sound away from the enclosure and an opposing rear surface of the driver is configured to radiate rear sound into the enclosure, and the enclosure defines one or more openings that are configured to allow the rear sound to escape from the enclosure into an external environment. In an example the openings are configured to allow the rear sound to escape from the enclosure along the majority of a circumference of the enclosure. In an example the openings comprise elongated slots. In an example the housing defines two opposed ends and a front and rear side, and the dipole acoustic radiator is located at one end of the housing such that the enclosure is located at the one end and the front and rear sides adjacent to the one end, and the enclosure openings are at the one end and the front and rear sides adjacent to the one end. In an example the soundbar includes two separate dipole acoustic radiators, one located at each end of the housing such that their enclosures are located at the ends and the front and rear sides adjacent to the respective ends, and the enclosure openings are at the respective ends and the front and rear sides adjacent to the respective ends. In an example the housing defines a height between bottom and top sides and the openings comprise elongated slots that extend along a majority of the height of the housing. In an example the openings encompass at least 20% of the area of the enclosure.

Some examples include one of the above and/or below features, or any combination thereof In some examples the dipole acoustic radiator sound emission defines main lobes forward and backward along the main radiation axis. In an example the dipole acoustic radiator sound emission further defines nulls along axes that are transverse to the main radiation axis. In an example the nulls exhibit a sound pressure level that is at least 10 dB less than the sound pressure level of the main lobes at one or more sound frequencies. In an example the dipole acoustic radiator is configured to radiate sound in a frequency range of 500 Hz and above.

In another aspect a soundbar includes a housing and a plurality of acoustic radiators carried by the housing and configured to output sound for at least left, right, center, left height, and right height audio channels, wherein the plurality of acoustic radiators comprise two separate dipole acoustic radiators that are configured to emit sound in opposite directions along a main radiation axis, wherein one of the dipole acoustic radiators is configured to output sound for the left height audio channel and the other dipole acoustic radiator is configured to output sound for the right height audio channel. The dipole acoustic radiators define sound emission main lobes forward and rearward along their main radiation axes and further define nulls transverse to their main radiation axes, wherein the nulls exhibit a sound pressure level that is at least 10 dB less than the sound pressure level of the main lobes at one or more sound frequencies.

Some examples include one of the above and/or below features, or any combination thereof In an example the dipole acoustic radiators each comprise an audio driver mounted in an enclosure such that a front surface of the driver is configured to radiate front sound away from the enclosure and an opposing rear surface of the driver is configured to radiate rear sound into the enclosure, and the enclosure defines one or more openings that are configured to allow the rear sound to escape from the enclosure into an external environment along the majority of a circumference of the enclosure. In an example the housing defines two opposed ends and a front and rear side, and one of the two separate dipole acoustic radiators is located at each end of the housing such that their enclosures are located at the ends and the front and rear sides adjacent to the respective ends, and the enclosure openings are at the respective ends and the front and rear sides adjacent to the respective ends. In an example the openings of each enclosure encompass at least 20% of the area of the enclosure.

DETAILED DESCRIPTION

Soundbars are used to reproduce at least left, right, and center channels of surround sound audio. Surround sound quality is improved if the listener can perceive height differences in the sound. Height channels are usually reproduced with speakers mounted in the ceiling. Surround sound systems can be simplified if height channels can be reproduced by the soundbar.

In order to perceive height differences in sound produced by a soundbar, the sound needs to be reflected off of the ceiling. Soundbar loudspeakers can be pointed up in order to bounce sound off the ceiling. However, since loudspeakers are generally omni-directional, the sound will also directly reach the listener, which reduces the height effect.

The present soundbar includes one or more dipole acoustic radiators. Dipole acoustic radiators develop greater sound pressure along their primary axis than they do in orthogonal directions. In a polar plot of sound pressure or sound energy taken radially around a dipole acoustic radiator, the highest sound pressure is in two main lobes that extend in opposite directions along the primary axis, while the sound pressure is lower in side lobes that extend in opposite directions along an axis that is orthogonal to the primary axis, sometimes called "nulls." In some examples one or both nulls of a dipole acoustic radiator exhibit a sound pressure level that is at least 10 dB less than the sound pressure level of one or both main lobes, at least at one or more frequencies of the radiated sound.

When a dipole acoustic radiator is used to reproduce a height channel in a soundbar, the primary axis can be pointed up, at the ceiling. This placement directs a null to the front of the soundbar, toward the listener. Accordingly, substantially more sound pressure will reflect off the ceiling than will directly reach the listener. A result is that the height channel is reproduced with less impact from the height sound directly reaching the listener, thus increasing the height effect.

In some examples a dipole acoustic radiator can also or alternatively be used to reproduce the left and/or right channel, with a null pointed at the listening location and a main lobe pointed to the left or right where it can reflect off a side wall of the room in which the soundbar is located. As with the height channel, this left/right channel use of the dipole acoustic radiator will reduce the amount of left or right sound that directly reaches the listener as compared to the reflected sound that comes from the left or right. A result is that the left and/or right channel is reproduced with less impact from the left or right sound directly reaching the listener, thus increasing the left/right separation effect.

A dipole acoustic radiator can be accomplished in multiple manners. In an example the dipole acoustic radiator includes an acoustic radiator with its front and rear substantially open to the environment, so that the sound pressure level (SPL) is approximately the same along the primary axes of the front and rear sides of the diaphragm of the acoustic radiator, at least at some frequencies, while SPL is lower on the null axes. The extent to which the front and rear are open is relative. Effective openings for dipole-like operation involve the openings (and any other aspects of the dipole acoustic radiator that contribute to the front and rear-side SPL such as the design of the acoustic cavity) being such that the SPL of the acoustic radiation is greater along the primary axes than it is along transverse axes, including but not limited to the orthogonal axes. The SPL being the same in both directions along the primary axes is also relative. A true theoretical dipole acoustic radiator will have a figure eight-shaped SPL polar plot, with equal primary lobes forward and backward along the primary axes, and zero SPL nulls at +90 and −90 degrees from the forward direction (i.e., along axes that are orthogonal to the primary axes).

In the present soundbar, a dipole acoustic radiator will have higher SPL along the primary axes than it does along the transverse or orthogonal axes. In most but not all cases the SPL along the primary axes is at least 10 dB greater than is the SPL along or close to the orthogonal axes at some, most, or all of the radiated frequencies. This arrangement provides sufficient SPL directed upward (for a height channel) or to the left or right (for a left or right channel) to accomplish a height, left, or right channel where the listener perceives that sound comes from above, the left, or the right, respectively, while minimizing the amount of sound projected directly toward the listener located in front of the soundbar, which would have a negative impact on the perception of height or direction.

In another example of a dipole acoustic radiator, two acoustic radiators can be mounted back-to-back such that they radiate in opposite directions. The radiators can be controlled so that they radiate synchronously. Other designs for dipole acoustic radiators are known in the technical field and included within the scope of the present disclosure.

Figure 1:
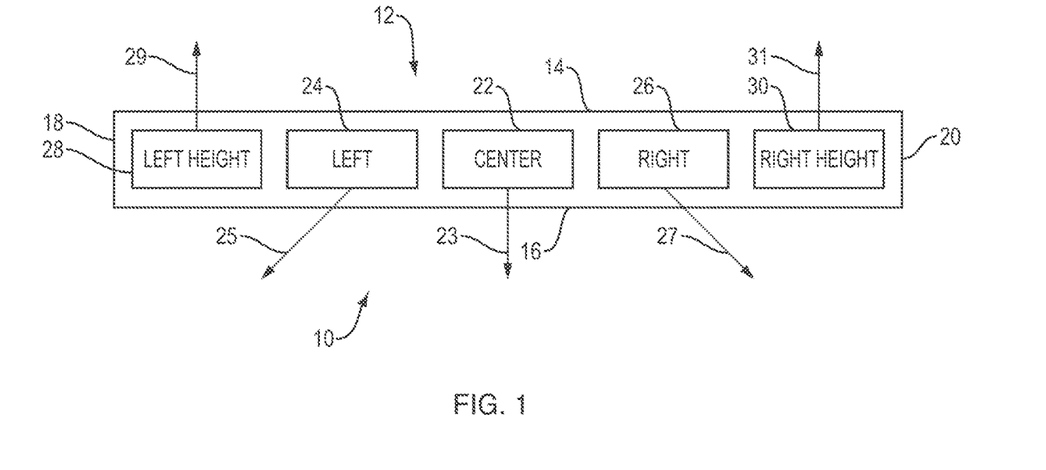
FIG. 1 is schematic illustration of a soundbar.

FIG. 1 is schematic illustration of a soundbar 10. Soundbar 10 includes housing 12 with top 14, bottom 16, left end 18, and right end 20. Soundbars can have any number of acoustic radiators, but are generally configured to reproduce at least the left, center, and right acoustic channels, as is well known in the field. Present soundbar 10 is also configured to reproduce left and right height audio channels. Although any particular channel may be reproduced by more than one transducer in combination, the acoustic radiators of soundbar 10 are represented functionally, with a numbered block representing the one or more radiators that are used to reproduce any particular channel. The radiators include those that reproduce a left height channel 28 (and primarily radiate upwardly, as indicated by arrow 29), those that reproduce a right height channel 30 (and primarily radiate upwardly, as indicated by arrow 31), those that reproduce a left channel 24 (and primarily radiate to the left, as indicated by arrow 25), those that reproduce a right channel 26 (and primarily radiate to the right, as indicated by arrow 27), and those that reproduce a center channel 22 (and primarily radiate in a forward direction, as indicated by arrow 23). In some examples one or more of the left, right, and center channels are reproduced with an array of multiple radiating elements with controllable delay between elements so that a tight polar pattern aimed in a desired direction can be produced. In some examples any one or more of the left height, right height, left, and right channels may be reproduced using a dipole acoustic radiator.

Figure 2:
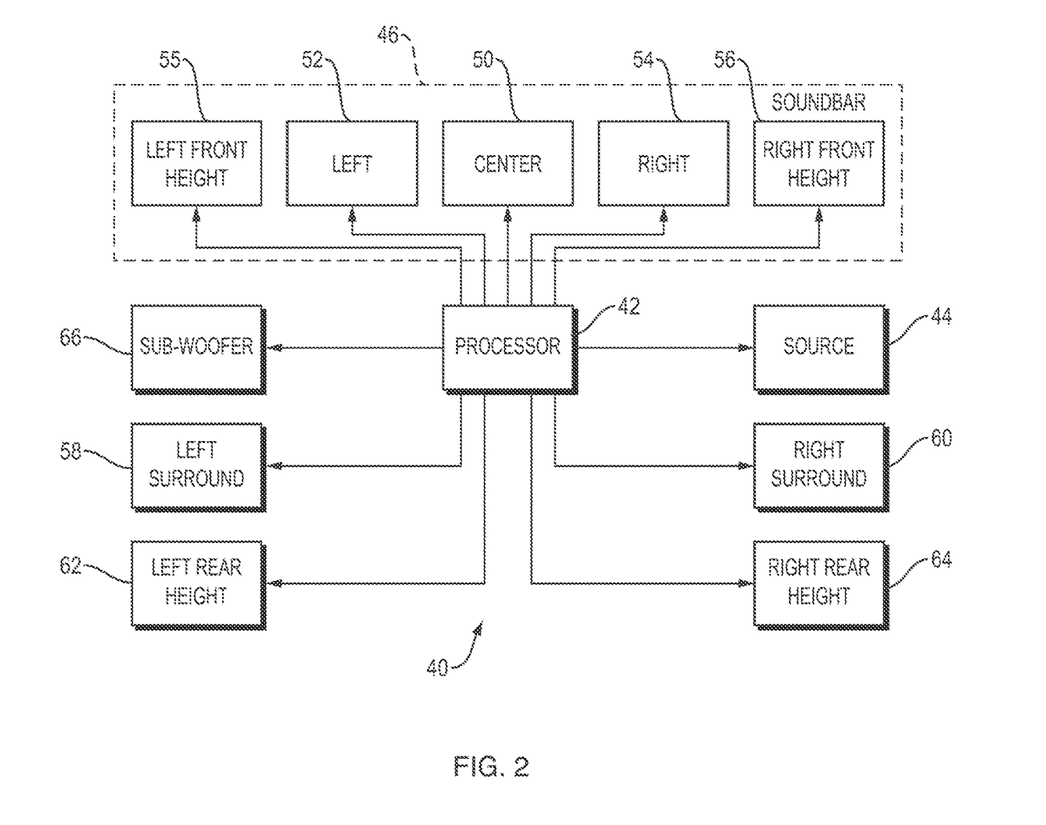
FIG. 2 is a functional block diagram of a surround sound system.

FIG. 2 is a functional block diagram of a surround sound system 40, illustrating one non-limiting use of a soundbar. It should be noted that many surround sound systems will not have all of the channels noted in the drawing. Processor 42 is configured to receive input audio signals (over wires, or wirelessly) from audio source 44. Processor 42 provides audio data or audio signals to the audio transducers of soundbar 46 and any additional transducers that are not included in the soundbar. Soundbar 46 includes transducers that are used to reproduce one or more of center, left, right, left front height, and right front height channels 50, 52, 54, 55, and 56, respectively. Other channels can include zero or more of sub-woofer 66, left and right surround 58 and 60, respectively, and left and right rear height 62 and 64, respectively. In some examples, such as illustrated in FIG. 1, the height channel is not broken into front and rear, but rather each side (left height and right height) is handled using a single channel. Note also that surround sound systems can have additional or different channels, and/or additional or different transducers.

Figure 3:
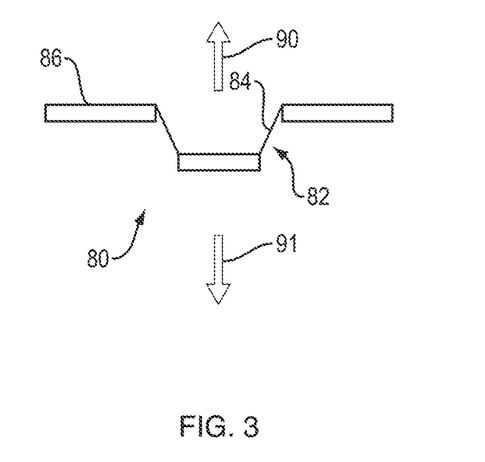
FIG. 3 is a schematic illustration of a dipole acoustic radiator.

FIG. 3 is a schematic illustration of a dipole acoustic radiator 80 that comprises audio transducer 82 with radiating surface (e.g., diaphragm) 84. Transducer 82 is mounted to panel or other support 86 such that it is open to the front and rear. As diaphragm 84 is moved up and down it produces sound pressure that moves outward, along forward and rear primary radiation axes 90 and 91 that are, in an ideal sense, parallel. For an ideal radiator the front and rear sound pressure is the same, and is out of phase. Accordingly, the sound along the two axes that are orthogonal to axes 90 and 91 (not shown) cancels, producing nulls at about 90 degrees to the primary axes. As is known in the field, a polar plot of the dipole acoustic radiator looks like a figure eight aligned along the primary axes. In some examples the dipole acoustic radiator is configured such that a primary radiation axis is pointed in a desired direction or at a desired location and/or a null is pointed in a desired direction or at a desired location. In an example of a dipole acoustic radiator used for a soundbar height channel a primary radiation axis is pointed up toward the ceiling and a null is pointed outward toward the expected location of a person listening to the sound (e.g., directly in front of the soundbar, which is intended to be mounted below or above a television). In this example sound will hit and be reflected from the ceiling, and thus be perceived as emanating from above the listener, while the null pointed at the listener will help to maintain the height perception. In an example of a dipole acoustic radiator used for a soundbar left or right channel a primary radiation axis is pointed to the left or right, toward a side wall of the room, and a null is pointed outward toward the expected location of a person listening to the sound (e.g., directly in front of the soundbar, which is intended to be mounted below or above a television). In this example sound will hit and be reflected from the left or right wall, and thus be perceived as emanating from the left or right of the listener, while the null pointed at the listener will help to maintain the left or right perception. In some examples dipole acoustic radiator 80 is used as a transducer for the left height, right height, left, and/or right channels of a soundbar.

Figure 4:
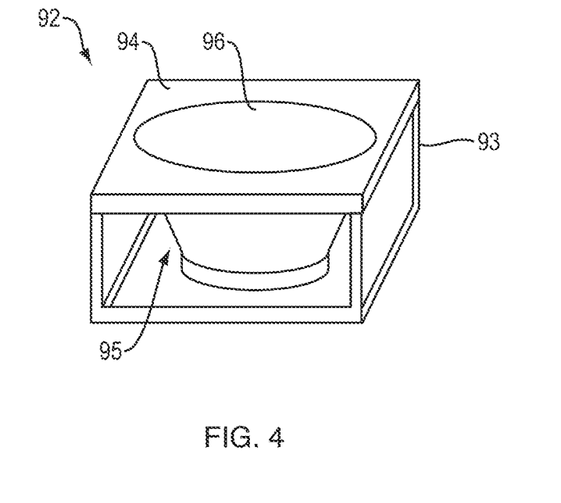
FIG. 4 is a schematic illustration of a dipole acoustic radiator that includes an enclosure.

FIG. 4 is a schematic illustration of a dipole acoustic radiator 92 that can be used in a soundbar. Dipole acoustic radiator 92 includes transducer 95 mounted in enclosure 93. Enclosure 93 includes top 94 with opening 96 for emitting front-side radiation. One or more sides and/or the bottom of enclosure 93 are open sufficiently such that sound is also emitted from the rear of the transducer. The area and location of openings from the rear of the transducer to the environment in part dictate how close to ideal the dipole acoustic radiator radiation pattern is, and the frequencies at which dipole behavior is exhibited. The sizes, shapes, and locations of rear openings can be selected to achieve a desired dipole performance given any constraints due to the physical design of a soundbar in which dipole acoustic radiator 92 is located.

Figure 5:
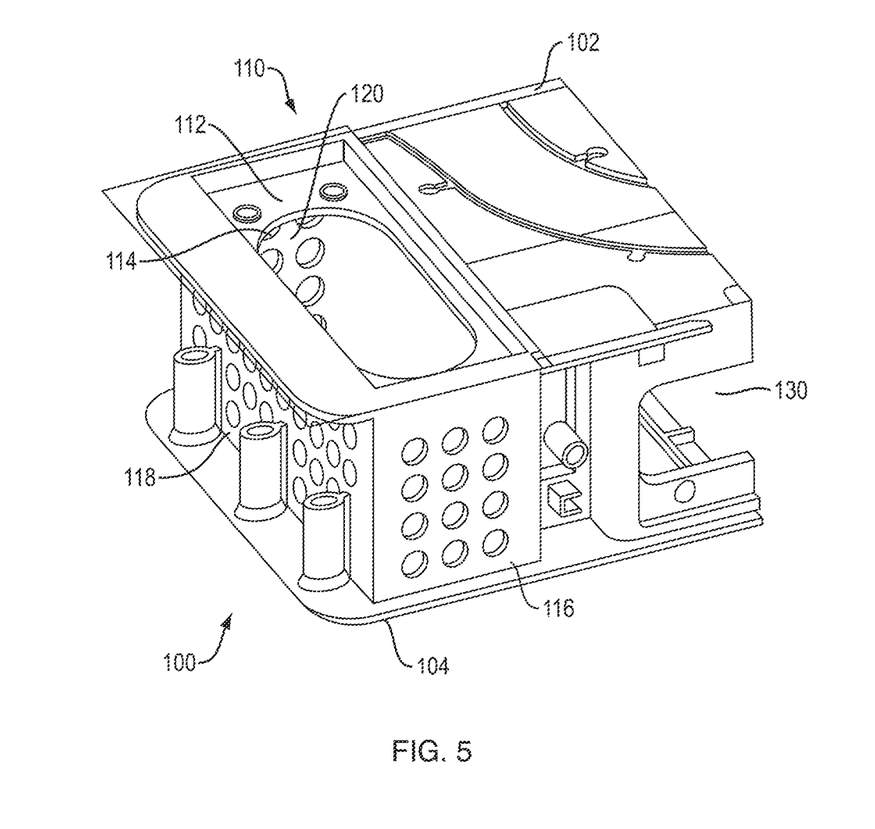
FIG. 5 is a perspective view of an end of a housing for a soundbar that includes a height-channel transducer.

FIG. 5 is a perspective view of part of the left end 100 of a housing for a soundbar that includes a height-channel transducer, in this instance a left height channel dipole acoustic radiator (not shown). End enclosure 110 includes oval opening 114 in top 112 that is configured to hold an oval-shaped acoustic transducer (not shown) that is used to generate the sound for a dipole acoustic radiator. An oval shape is exemplary and not limiting of the scope of this disclosure, as the transducer's shape could be round, rectangular, or otherwise. In a soundbar in which both left and right height channels are reproduced using two separate dipole acoustic radiators, the right end of the housing (not shown) could be identical to the left end, and also carry a single dipole transducer for the right height channel.

Enclosure 110 is further defined by end wall 118, front wall 116, and rear wall 120. In an example each of these three walls includes one or more openings that allow sound pressure to escape from the rear of the transducer into the environment. The openings can be round, oval, or any shape. In examples herein the openings encompass from 0 to 100% of the areas of the walls. Since the front and rear sides of the transducer are both open to the environment, the transducer will act as a dipole acoustic radiator. Bottom wall 104 does not include openings because in most cases the soundbar will sit on a surface, which would block any such openings. However, the bottom could include openings. Any one or more of the sides and bottom of enclosure 110 can have a desired open area, with such open area accomplished with an entirely open side, or one or more openings of any desired size, shape and location. In an example the openings are elongated slots that extend along most of the height of each of the three sides. In an example the openings extend along a majority of the circumference of the enclosure. In some examples the openings encompass at least about 20% of the area of the enclosure behind the transducer diaphragm, to accomplish a dipole behavior that is sufficient to reproduce a height channel.

Also shown are a small portion 102 of the rest of the soundbar housing, including part of opening 130 that is configured to house the left channel transducer(s) (not shown). Not shown are locations for other transducers of the soundbar, such as the transducer(s) for the center and right channels, and a right height channel. In some examples a soundbar includes a left height channel and a right height channel. In an example one dipole acoustic radiator is used to reproduce the right height channel and a separate dipole acoustic radiator is used to reproduce the left height channel.

Figure 6:
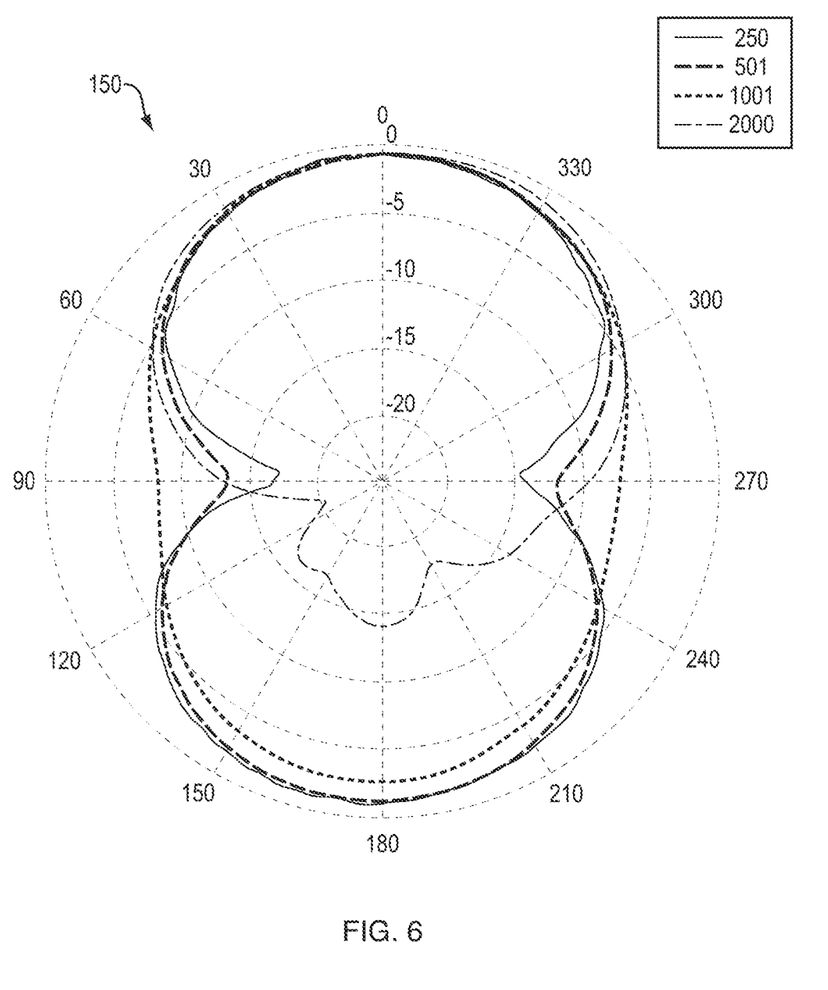
FIG. 6 is a polar plot of the output of a dipole acoustic radiator for a soundbar.

FIG. 6 is a polar plot 150 of the output of a dipole acoustic radiator for a soundbar. Plot 150 includes the SPL (in dB) at 360 degrees around the transducer. The zero degree direction is on-axis of the front side radiation while the 180 degree direction is on-axis of the rear side radiation. The radiation at 90 and 270 degrees are on axes that are orthogonal to the front and rear side primary axes, termed the null axes. As can be seen, at 250 and 501 Hz the plot is essentially a pure dipole, with essentially equal SPL at zero and 180 degrees and about 13 dB or more lower SPL at 90 and 270 degrees. At 1000 Hz it starts to transition and the side nulls soften to about 8 dB. Above that frequency the radiator becomes more unipolar (up firing) but side energy is naturally low so the objectives of the dipole radiator (greater SPL pointed up at the ceiling than directly toward the listener) are still met. When the front side axis is pointed up, at the ceiling, and a null is pointed directly in front of the soundbar, a listener located in front of the soundbar will perceive the sound as emanating from the ceiling. The dipole acoustic radiator is thus able to reproduce a height channel.

Figure 7:
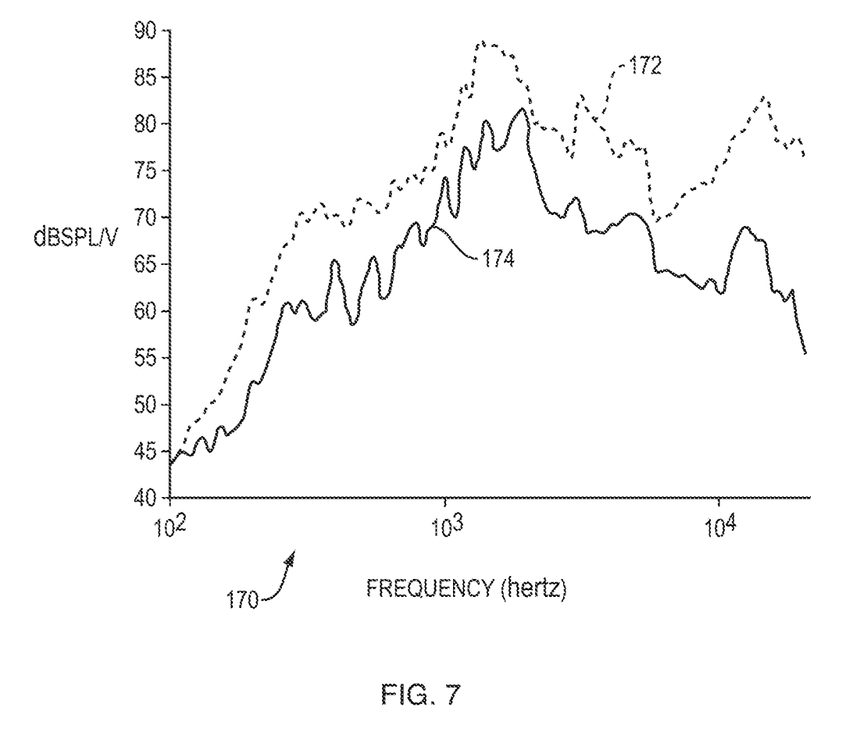
FIG. 7 is a plot of the sound pressure level at two angular positions relative to a dipole acoustic radiator for a soundbar.
Figure 8:
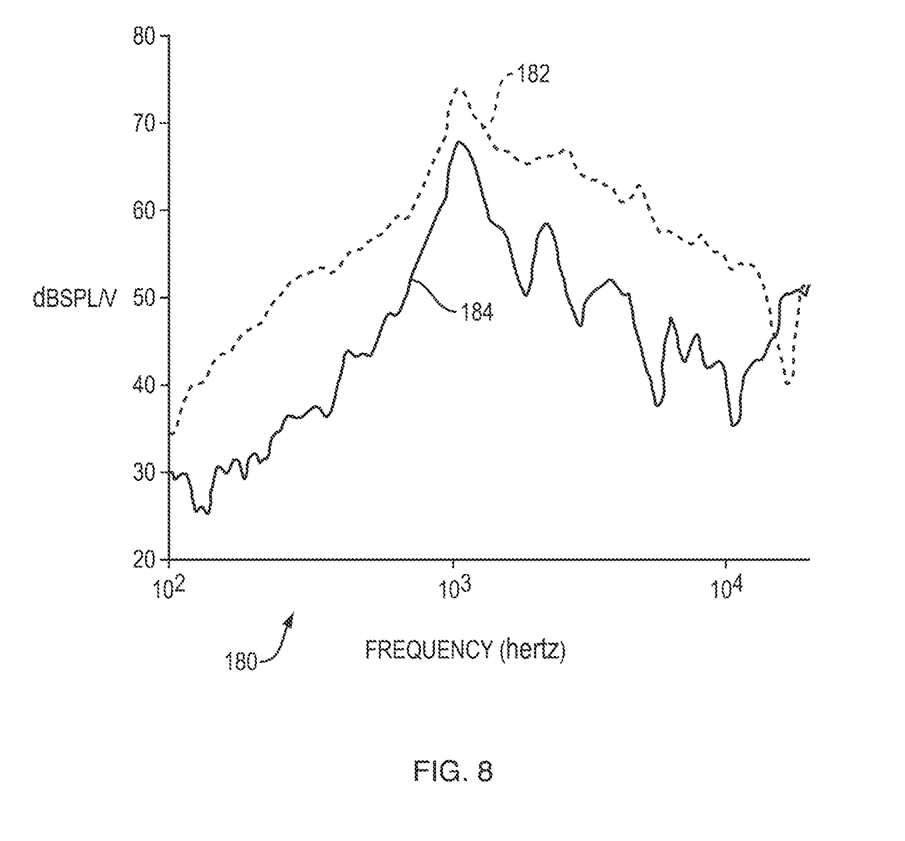
FIG. 8 is a plot of the sound pressure level at two angular positions relative to a dipole acoustic radiator for a soundbar.

FIG. 7 is a plot of the sound pressure level across a large frequency range (100 Hz to about 20 kHz) at two angular positions relative to a dipole acoustic radiator that can be used in a soundbar similar to that shown in FIG. 5. Plot line 172 is along the front primary axis (i.e., at zero degrees on a polar plot) and plot line 174 is at 90 degrees. The peaks just above 1000 Hz are due to Helmholtz resonance caused by the internal volume of the rear side enclosure combined with the area of the openings to the environment. As can be seen, the null axis radiation is less than that along the primary axis across the entire spectrum, and at many frequencies the difference is 5 dB or more. FIG. 8 is a similar plot of the sound pressure level at 20 degrees (line 182) and 90 degrees (line 184) for the same transducer design. The separation is even greater at these angular positions. In some examples for the design of a left or right height channel, understanding SPL at 20 and 90 degrees can be useful to understanding the sound that is likely to reflect off the ceiling and reach the listener (the 20 degree sound) and the sound that is likely to directly reach the listener (the 90 degree sound). The plots of FIGS. 7 and 8 support the dipole-like output of two angular positions separated by 70-90 degrees relative to a dipole acoustic radiator for a soundbar across the entire illustrated frequency range.

In some examples the dipole is oriented so as to maintain the greatest difference between the energy directed upward toward the ceiling and the energy directed toward the listener. In such examples, the directivity curve of the dipole has an upwards and downwards beam and a null that is three dimensional in the horizontal plane. The null dip is quite narrow and deep, while the upward lobe is broad and more gradually changing with angle. If the dipole were angled slightly forward rather than being directed straight up, the energy reflected off the ceiling could be slightly greater (about 1 dB), but the deepest null would not be directed toward the user (in the horizontal plane), thereby reducing the benefit of the dipole configuration. As the slope around the null is much greater than the slope of the upward lobe, the greatest difference between the two angles is achieved if the null is in the horizontal plane. Thus, the greatest difference is generally achieved when the primary axis is pointed directly up rather than angled at say 20 degrees from the vertical. However, in some implementations, the dipole driver(s) could be angled, such as angled 1-30 degrees toward or away from the user, such as 20 degrees toward the user, and even for those angled implementations, the dipole configuration can help improve the directionality of the audio output. The dipole primary axis could also be angled slightly to the left or right (e.g., angling the dipole driver toward or away from the center of the soundbar). Outwardly directed dipoles could, e.g., spread the apparent widths of the two height channels. For such configurations, the dipole driver(s) could be angled 1-30 degrees inward or outward, such as 20 degrees outward, depending on the desired configuration.

The dipole driver(s) are beneficial when used to render audio that is intended to be spatialized. For example, use of one or more dipole drivers can improve output of audio that includes a height component, such as Dolby Atmos® audio content or other object-oriented audio content, as use of one or more dipole drivers can improve audio output directivity and thus provide a better sense of audio height and/or diffuseness.

In the far-field in particular, the dipole behavior can lead to low frequency cancelation and thus an extra about 6 dB per octave roll-off that should be equalized out. So there is a practical limit to how low in frequency to drive the dipole transducer based on the size of the driver and its excursion capability. 500 Hz is an approximate practical lower limit for the dipole acoustic radiator, in part because the perception of height is reduced at lower frequencies so there is less benefit to going below about 500 Hz. In some examples the dipole acoustic radiator is configured to reproduce sound in a frequency where dipole radiation causes a 10-15 dB loss in low-frequency output, ideally from the highest frequencies down to around 500 Hz, or below. SPL measurements of a dipole acoustic radiator can assist with soundbar design and the placement and orientation of the driver(s) and the design considerations (e.g., the rear enclosure volume and rear opening area) of the driver's enclosure. SPL measurements and polar plots are information that can be used to achieve a good soundbar and surround sound design compromise. SPL measurements provide information about the frequency response. Also, SPL measurements can be used to determine whether the design accomplishes good spacing between the curves (10 to 15 dB), uniformity of spacing across the frequency range, and an adequate frequency response (relatively smooth and not so rolled off at low frequencies that an excessive boost might be needed).

Elements of figures are shown and described as discrete elements in a block diagram. These may be implemented as one or more of analog circuitry or digital circuitry. Alternatively, or additionally, they may be implemented with one or more microprocessors executing software instructions. The software instructions can include digital signal processing instructions. Operations may be performed by analog circuitry or by a microprocessor executing software that performs the equivalent of the analog operation. Signal lines may be implemented as discrete analog or digital signal lines, as a discrete digital signal line with appropriate signal processing that is able to process separate signals, and/or as elements of a wireless communication system.

When processes are represented or implied in the block diagram, the steps may be performed by one element or a plurality of elements. The steps may be performed together or at different times. The elements that perform the activities may be physically the same or proximate one another, or may be physically separate. One element may perform the actions of more than one block. Audio signals may be encoded or not, and may be transmitted in either digital or analog form. Conventional audio signal processing equipment and operations are in some cases omitted from the drawing.

A number of implementations have been described. Nevertheless, it will be understood that additional modifications may be made without departing from the scope of the inventive concepts described herein, and, accordingly, other examples are within the scope of the following claims.

What is claimed is:

1. A soundbar comprising:
   a housing; and
   a plurality of acoustic radiators carried by the housing and configured to output sound that includes a height component, at least one of the acoustic radiators including a dipole acoustic radiator configured to i) output the height component and ii) emit sound in opposite directions along a main radiation axis,
   wherein a sound pressure level along the main radiation axis is greater than a sound pressure level along a null axis orthogonal to the main radiation axis, such that the height component is reproduced by more sound pressure radiated along the main radiation axis compared to sound pressure radiated along the null axis, and
   wherein the housing includes an end enclosure having one or more openings that allow sound pressure from a rear side of the dipole acoustic radiator to escape into an environment, wherein the one or more openings are located along at least one of a front wall, a rear wall, or an end wall of the end enclosure.

2. The soundbar of claim 1, wherein at least some of the plurality of acoustic radiators are further configured to output at least a left audio channel and a right audio channel.

3. The soundbar of claim 2, wherein at least some of the plurality of acoustic radiators are further configured to output a center audio channel.

4. The soundbar of claim 1, further comprising an additional dipole acoustic radiator, wherein the dipole acoustic radiator is configured to output a left height audio channel and the additional dipole acoustic radiator is configured to output a right height audio channel,
wherein the dipole acoustic radiator and additional dipole acoustic radiator are located at opposed ends of the housing.

5. The soundbar of claim 1, wherein the main radiation axis points up at a ceiling of a room when the soundbar is positioned in the room,
wherein the height component of the sound is reproduced by more sound pressure reflecting off the ceiling and reaching the expected location of a person in a listening area of the room as compared to sound radiated along the null axis that directly reaches the expected location of the person.

6. The soundbar of claim 1, wherein the housing includes front and top sides, the main radiation axis extending from the top side of the housing and the null axis extending from the front of the housing.

7. The soundbar of claim 1, wherein the dipole acoustic radiator is configured to output the height component through an elongated slot in a top of the housing.

8. The soundbar of claim 1, wherein the sound pressure level along the main radiation axis is 5 dB or more greater than the sound pressure level along a null axis orthogonal to the main radiation axis for at least some frequencies.

9. A method of providing audio output from an audio device that includes a housing, a plurality of acoustic radiators carried by the housing, and at least one processor, the method comprising:
using the at least one processor, receiving input audio signals and providing audio data to at least one of the acoustic radiators, the at least one of the acoustic radiators including a dipole acoustic radiator; and
using the dipole acoustic radiator, outputting a height component from the audio data and emitting sound in opposite directions along a main radiation axis,
wherein a sound pressure level along the main radiation axis is greater than a sound pressure level along a null axis orthogonal to the main radiation axis, such that the height component is reproduced by more sound pressure radiated along the main radiation axis compared to sound pressure radiated along the null axis, and
wherein the housing includes an end enclosure having one or more openings that allow sound pressure from a rear side of the dipole acoustic radiator to escape into an environment, wherein the one or more openings are located along at least one of a front wall, a rear wall, or an end wall of the end enclosure.

10. The method of claim 9, further comprising outputting, using at least some of the plurality of acoustic radiators, a left audio channel and a right audio channel.

11. The method of claim 10, further comprising outputting, using at least some of the plurality of acoustic radiators, a center audio channel.

12. The method of claim 9, wherein the dipole acoustic radiator outputs a left height audio channel, and wherein the method further comprises outputting, using an additional dipole acoustic radiator, a right height audio channel, wherein the dipole acoustic radiator and additional dipole acoustic radiator are located at opposed ends of the housing.

13. The method of claim 9, wherein the main radiation axis points up at a ceiling of a room when the audio device is positioned in the room,
wherein the height component of the sound is reproduced by more sound pressure reflecting off the ceiling and reaching the expected location of a person in a listening area of the room as compared to sound radiated along the null axis that directly reaches the expected location of the person.

14. The method of claim 9, wherein the housing includes front and top sides, the main radiation axis extending from the top side of the housing and the null axis extending from the front of the housing.

15. The method of claim 9, wherein the dipole acoustic radiator outputs the height component through an elongated slot in a top of the housing.

16. The method of claim 9, wherein the sound pressure level along the main radiation axis is 5 dB or more greater than the sound pressure level along a null axis orthogonal to the main radiation axis for at least some frequencies.

17. The soundbar of claim 1, wherein the one or more openings include a plurality of openings along each of the front wall, the rear wall, and the end wall of the enclosure, and wherein the dipole acoustic radiator outputs the height component from a top wall of the enclosure.

18. The soundbar of claim 1, wherein the one or more openings encompass an area of the enclosure behind the acoustic radiator to accomplish a dipole behavior that is sufficient to reproduce the height component.

19. The method of claim 9, wherein the one or more openings include a plurality of openings along each of the front wall, the rear wall, and the end wall of the enclosure, and wherein the dipole acoustic radiator outputs the height component from a top wall of the enclosure.

* * * * *